June 29, 1943.   W. C. EDMUNDSON   2,323,124
ELECTRICAL CONDENSER
Filed March 6, 1940
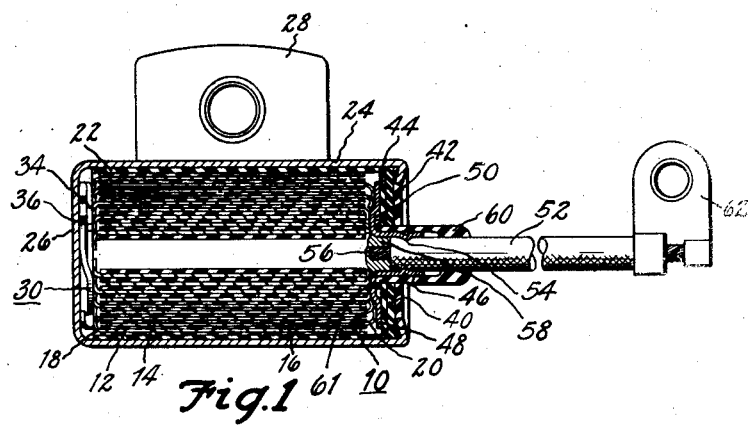
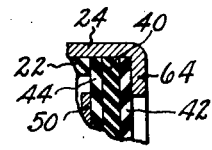
Fig. 2
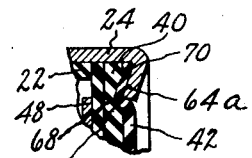
Fig. 3
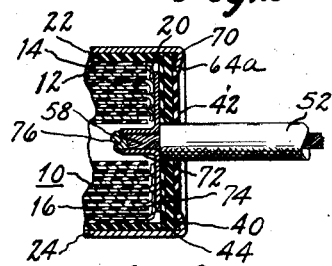
Fig. 4
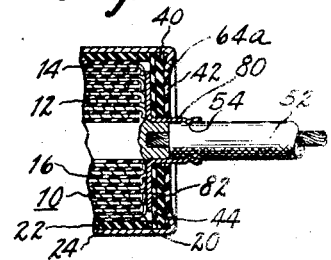
Fig. 5
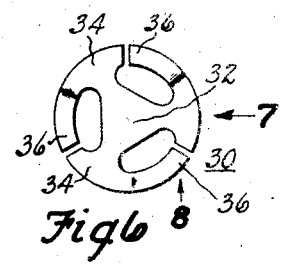
Fig. 6
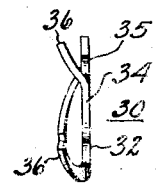
Fig. 7
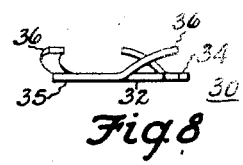
Fig. 8
INVENTOR
William C. Edmundson
BY
Spencer Hardman
ATTORNEYS Patented June 29, 1943

2,323,124

UNITED STATES PATENT OFFICE 2,323,124

ELECTRICAL CONDENSER

William Clarrel Edmundson, Anderson, Ind., assignor to General Motors Corporation, Detroit, Mich., a corporation of Delaware Application March 6, 1940, Serial No. 322,433

1 Claim. (Cl. 175—41)

This invention relates to electrical condensers and has for an object to provide a structure that will assure permanent contact with the condenser electrodes, and that will maintain the container elements in absolute sealing relation.

A further object of the invention is to provide a condenser construction in which the condenser body is supported within a container under rather stiff spring pressure, the contributing parts being capable of effecting and maintaining an air and water tight seal against ingress or egress of foreign matter, through any junctures of the condenser.

A further object of the invention is to provide means and a method for sealing a condenser container, that will be simple in construction, easy of fabrication and certain of performance.

A still further object of the invention is to perfect a hermetic seal of a metallic casing by means of a laminated closure member.

The foregoing objects are accomplished by enclosing a condenser body within a casing, by inserting within a deep drawn cup and forcing it against a spring steel member, and then closing the open end of the casing by turning in a flange and deflecting it axially, to depress into a yieldable flexibly coated insulator, which in turn presses a contact disc against one end of the condenser body and causes the condenser body to compress the steel spring against the bottom of the housing, whereby the reflex action of the spring, with its great take-up properties, will maintain electrical contact between the condenser electrodes and the terminals provided.

Further objects and advantages of the present invention will be apparent from the following description, reference being had to the accompanying drawing wherein a preferred embodiment of the present invention is clearly shown.

In the drawing:

Fig. 1 is a longitudinal sectional view of an electrical condenser embodying the instant invention.

Fig. 2 is a fragmentary sectional view, on an enlarged scale, illustrating one step in the process of assembling the condenser.

Fig. 3 is a similar view showing the parts in a relation accomplished by a succeeding step.

Fig. 4 is a fragmentary sectional view, showing a slight modification of the container closure assembly.

Fig. 5 is a similar view, of another modification of the closure assembly.

Fig. 6 is a plan view of a contact and seal maintaining member, preferred for effecting the stated invention.

Fig. 7 is an elevational view, substantially as indicated by the arrow 7, in Fig. 6.

Fig. 8 is an elevational view, substantially as indicated by the arrow 8, in Fig. 6.

With particular reference to the drawing, 10 indicates a condenser body comprising a pair of foils or electrodes 12 and 14, interleaved with insulators or spacers 16 and wound into cylindrical form as is the usual and well known practice. Also as is customary, the electrodes 12 and 14 with a suitable number of spacers are wound in slightly offset relation, such that the foil or electrode 12 is disposed laterally of the center line to present exposed foil edge 18, while the electrode 14 is offset in the opposite direction to provide the exposed foil edge 20, it being the usual practice to crush down the exposed foil edges at both ends of the cylindrical body, as indicated in the drawing, thereby making provisions for a non-inductive winding of the condenser electrodes. That crushing of the foil edges 18 and 20 may be accomplished by opposite and endwise pressure upon the cylindrical mass, which after being effected is wrapped with an insulator 22 that operates as a liner between the condenser body and a surrounding housing 24.

The housing member 24 comprises a deep drawn cup like member of some ductile material, such as brass or the like, and provides a flat bottom wall 26 integrally formed therewith, and has affixed thereto a mounting bracket 28, that also acts as one terminal for the condenser construction. Before inserting the condenser body 10 and its insulator 22 within the casing 24, a spring member 30 is disposed against the bottom wall 26 of the cup, such as to engage the crushed down foil edge 18 and the wall 26, thereby acting as an electrical conductor between one of the electrodes of the condenser and the container or housing member.

The particular form of the spring that is preferred is illustrated in Figs. 6, 7, 8, where it is shown as representing in plan a triskelion, or trifid. While applicant has illustrated a member of trilobular configuration, he does not thereby limit himself to that form, since it is obvious that any specific form of spring plate performing the same functions and with the same efficiency comes within the scope of his specification. In main, the spring member 30 comprises a body portion 32 having radially extending arms 34 ending in the lateral branches 36 that are equiangularly spaced, and sufficient in number to provide a firm and non-teetering support for the spring member, when the extensions 36 are all deflected to one side of the body portion 32. The deflection and detailed arrangement of the extensions 36 has been illustrated in Figs. 7 and 8. Specifically, irrespective of the particular contour or configuration of the spring 30, applicant has found the most exacting requirements are best fulfilled when the spring member is manufactured from annealed spring steel of about .022 to .024 inch in thickness and so fabricated that the extensions 36 will require a force of ten to twenty pounds for effecting a deflection in the order of one thirty-second of an inch. Equivalents include nickel, steel, annealed carbon steel (tempered after forming) and other materials characterized by like properties. While all have been used it is preferable that the spring 30 be fabricated from what is popularly known as 18-8 stainless steel which gets its hardness from cold working.

The spring 30 is disposed within the cup 24 such that the extensions 36 engage the bottom wall 26, which thereby leaves a maximum area of the spring 30, comprising the central portion 32 and the radial extensions 34, that abut against the exposed foil edge 18 of the condenser body. That surface is indicated at 35 in Figs. 7 and 8.

An end closure including a terminal or lead out device is then fitted within the open end of the casing 24 and subsequently secured in sealing relation. The preferred form of end closure is illustrated in Fig. 1, and includes an insulator 40 both sides of which are covered by a rubber like material 42 and 44. The elements 40, 42 and 44 may be of laminated structure in which the layers 42 and 44 are cemented or integrally bonded to the insulator 40, such as is accomplished by vulcanizing soft rubber upon comparatively rigid insulating material, in the nature of bakelized duck or the like. In any event, the insulator 40 with its coextensive layers 42 and 44 are cut into annular form so as to fit closely within the open end of the housing member 24, and support at the central aperture, a lead out assembly.

The lead out assembly shown in Fig. 1 comprises an eyelet 46 having a wide flange 48 with a concentric depressed or annular portion 50. The tubular portion of the eyelet closely receives an insulated lead 52, and is anchored thereto by staking or necking in as at 54 which partially penetrates the insulation of the lead. The end of the insulation is cut away or stripped off to leave a bared portion 56 of the conductive element, and which is secured to the eyelet by solder as at 58. When this assembly of lead and eyelet has been completed, a soft rubber grommet 60 of the sleeve type is passed over the lead 52, and has a flange 61 that is disposed within the recess 50 of the eyelet flange. The soft rubber grommet 60 is of such a construction and dimension that it must be stretched somewhat to pass over the lead 52 and the tubular portion of the eyelet. Under such conditions and fabrication the lead out assembly is then passed thru the aperture of the coextensive discs 40, 42 and 44, until the flanges 48 and 61 engage the rubber layer 44. A terminal clip 62 may then be attached to the lead in the usual manner.

When this end assembly has been passed within the open end of the housing 24, the flange 48 of the eyelet then presses against the foil edge 20, and while it is held firmly in that position the terminal edge of the open end of the cup 24 is spun or crimped inwardly as shown at 64 in Fig. 2, which maintains the parts in assembled relation. In the next step of assembly, the flange 64 is bent at an acute angle, or deflected toward the bottom wall of the housing 24, such as indicated at 64a in Fig. 3. That final step of assembly places all of the elements of the condenser between the bottom wall 26 and the retaining flange 64 under a state of compression, which is relieved only by the slight take up of contacting surfaces and results in a substantial amount of compression or flattening of the stiff spring member 30. The reflex spring force exerted by the spring 30 is sufficient to act against the bottom wall 26 of the casing and maintain contact between the bottom wall 26 and the foil edge 18, and also to maintain electrical contact between the foil edge 20 and the flange 48 of the eyelet. That positively assures that the elements 28 and 62 of the condenser construction will each be electrically connected with one of the electrodes of the condenser.

The great take-up force exerted by the spring 30, also acts to press forcibly the flange of the eyelet against the layer of rubber 44, and to press the entire end assembly against the axially deflected flange portion 64a, thereby insuring an absolute seal against air and moisture passing between either the flange 48 of the eyelet and the layer 44, or between the soft rubber grommet 60 and the edges of the coextensive discs 40, 42 and 44 or between the grommet and the eyelet, and also between the rubber layer 42 and the deflected flange 64a of the cup. Thus the spring 30 performs a dual function, in that it assures permanent electrical contact between the outside terminals and the electrodes of the condenser winding, and also effects a continued sealing pressure at all junctures of the condenser container. That is because the spring pressure causes the end assembly to be in depressed engagement with respect to the deflected flange 64a as shown in exaggerated form in Fig. 3. There, it will be observed, that the near corner 66 of the flange interengages so to speak, into the body of the rubber layer 42, and may cause a slight denting of the insulator 40 as show at 68. The disc 40 being hard and firm will not show much denting in practice. Furthermore, the deflecting of the flange 64a causes a peripheral portion 70 of the layer 42 to be compressed into triangular form in cross section, which effects a radial extension or flow of the rubber-like material against the cylindrical wall of the cup 24, at the edge of the disc members thereby doubly insuring against leakage between the edge of those discs and the wall of the cup 24.

In the instance of Fig. 4, the construction is substantially the same as has been herein described, with the exception that the terminal arrangement has been modified to include an eyelet 72 having a wide flat peripheral flange 74, the lead 52 having its bared portion 58 closely engaging the tubular portion of the eyelet, where it is secured by solder as at 76. The flange 74 is without a recess concentric with the tubular portion, and has a wide flat portion engaging the foil edges 20 and the inner rubber layer 44. In this instance, the aperture thru the end closure, that is, thru the coextensive discs 40, 42 and 44, is of the size to closely fit the insulation of the lead 52. Parallel with the function of the spring 30 in the device of Fig. 1 it here presses the condenser body 10 against the flange 74 and the flange 74 against the rubber layer 44, thus establishing a seal against leakage thru the container parts as well as establishing electrical contact between one of the electrodes of the condenser body and into respective outside terminal.

In Fig. 5, the modification of the terminal assembly is also slight, in that the eyelet 80 has a plane flange 82 disposed between, and forcibly engaging the foil edge 20 and the rubber layer 44 as in the other devices, and makes physical and electrical connection with the lead 52, as described with respect to Fig. 1. In this instance, the central aperture thru the end closure or members 40, 42 and 44, closely fits about the tubular portion of the eyelet 80. Here, too, as in the preceding device, the spring 30 forcibly maintains assured contact between the flange 82 of the eyelet and the foil edge 20, and also maintains sealing engagement between the flange 82 and the layer 44 of rubber-like material, as well as between the layer 42 of rubber-like material and the deflected flange 64a.

While the embodiment of the present invention as herein disclosed, constitutes a preferred form, it is to be understood that other forms might be adopted, all coming within the scope of the claim which follows.

What is claimed is as follows:

A condenser comprising a casing closed at one end and having an inwardly extending flange at its open end; a compressible cover in the open end of the casing; a condenser unit in said casing, having bared electrodes extending from each end; a terminal carried by the cover and engaging the bared condenser electrodes adjacent thereto; and a spring disc interposed between the closed end of the casing and the condenser unit, engaging the adjacent bared electrodes of the condenser and urging the condenser endwise to press the cover into sealing engagement with the casing flange.

WILLIAM CLARREL EDMUNDSON.